United States Patent
Choi

(10) Patent No.: US 10,616,947 B1
(45) Date of Patent: Apr. 7, 2020

(54) TCP PERFORMANCE OVER CELLULAR MOBILE NETWORKS

(71) Applicant: Akamai Technologies, Inc., Cambridge, MA (US)

(72) Inventor: Byung K. Choi, Boston, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/168,997

(22) Filed: May 31, 2016

Related U.S. Application Data

(60) Provisional application No. 62/167,916, filed on May 29, 2015.

(51) Int. Cl.
| | |
|---|---|
| *H04W 76/27* | (2018.01) |
| *H04L 12/841* | (2013.01) |
| *H04L 1/18* | (2006.01) |
| *H04W 24/02* | (2009.01) |

(52) U.S. Cl.
CPC ........... *H04W 76/27* (2018.02); *H04L 1/1848* (2013.01); *H04L 47/283* (2013.01); *H04W 24/02* (2013.01)

(58) Field of Classification Search
CPC ....... H04L 1/0002; H04L 1/187; H04L 1/188; H04L 1/1607; H04L 1/1848; H04L 43/0852; H04L 43/0864; H04L 47/263; H04L 47/283; H04L 69/163; H04W 24/02; H04W 28/12; H04W 28/0242; H04W 28/0273; H04W 52/346; H04W 80/00

See application file for complete search history.

(56) References Cited

U.S. PATENT DOCUMENTS

| | | | |
|---|---|---|---|
| 7,180,871 B1 * | 2/2007 | Khaflzov | ................ H04L 1/188 370/252 |
| 9,450,828 B2 * | 9/2016 | Serban et al. | |
| 2013/0258846 A1 * | 10/2013 | Damola | ................ H04W 80/06 370/230 |
| 2016/0330748 A1 * | 11/2016 | Bindrim | .............. H04L 65/1013 |

\* cited by examiner

*Primary Examiner* — Marsha D Banks Harold
*Assistant Examiner* — Dharmesh J Patel
(74) *Attorney, Agent, or Firm* — David H. Judson

(57) ABSTRACT

The technique herein optimizes delivery performance from a content delivery network (CDN) edge node, preferably by using knowledge of radio link allocation behavior. According to the technique herein, an IP address of a cellular end user (or equivalent) is recognized by the CDN edge. Then, preferably by tracking idle times both in consecutive downloading bursts in the end user session and in an on/off style radio link allocation pattern, the CDN edge adjusts transport layer network protocol parameters. The approach (which leverages the cross-layer intelligence obtainable from existing CDN infrastructure) thus enables the transport layer protocol implemented at the edge to optimize the delivery performance over the cellular mobile network.

16 Claims, 4 Drawing Sheets

TCP PERFORMANCE OVER CELLULAR MOBILE NETWORKS

BACKGROUND

Technical Field

This application relates generally to content delivery over cellular mobile networks using content delivery network (CDN) edge nodes.

Brief Description of the Related Art

Due to the proliferation of smart phones and tablets, cellular mobile networks have been increasingly used as access networks for online activities, such as web applications. Although cellular radio technology has been improving continuously as seen in the last several decades, the cellular mobile network is still recognized as a critical performance bottleneck with respect to its role as an access network to the end-to-end web applications over the Internet. FIG. 1 shows a simplified architectural model of 4G cellular mobile network 100. In the drawing, a radio resource controller (RRC) 102 resides in a base station (radio tower) 104. RRC 102 is the entity that manages allocation of the radio link between an end user and the base station. The RRC manages the radio link such that the link between the radio tower and end user is allocated only when needed. Also depicted is the packet core network 106, which serves the traffic between the RRC and a packet gateway 108. The communication protocols in the packet core network are proprietary in the sense that they are operated in a black box-style, i.e., not exposed to the other network protocol-speaking equipment outside the packet core network. The packet gateway 108 is the interface for the rest of the Internet 110. It is the intermediary between the packet core network and the Internet.

The medium access to the cellular network is controlled by the radio resource controller 102 with fine granularity. Because the radio is the critical resource, the objective of the radio management is to allocate the radio link only on actual demand. This means that the radio link is not pre-allocated in prediction of near future demand. The radio link is also reclaimed as soon as the RRC recognizes a time period of inactivity over the link. When a request comes, RRC takes some time to allocate the radio resource. This is called promotion time. Similarly, when the communication is over, the RRC also takes time to recognize the following inactivity for reallocation of the radio link. This is called demotion time. FIG. 2 shows a simplified model 200 for the promotion and demotion times. From an idle state 202, where no activity was found, a data transfer request comes in. Then, the RRC status transitions to an active state 204, which takes a promotion time. Likewise, when no activity is detected for some time, which eventually triggers a timeout, the RRC status transitions back to the idle state, taking a demotion time. In the model, D1 is the event of timeout qualifying the demotion from the active to an intermediate status 206. Likewise, D2 is the event of timeout for the demotion from the intermediate 206 to the idle status 202. P1 and P2 are the events, which take some time respectively for the promotion from the intermediate to the active, and, from the idle to the active status. The exact amounts of time for each transition are different for different generations of cellular radio network. The fundamental model of the on-off-style radio link allocation remains the same, however. Different generations of cellular mobile networks may have different number of intermediate states. For example, 4G networks have 2 intermediate states between active and idle.

The link layer resource control performed by the RRC is performed independently of higher network layer protocols, such as TCP and HTTP. Within one web browsing session, therefore, and depending on the end user behavior, it is likely that the radio link can repeatedly be allocated and reallocated. As a consequence, it is often difficult to optimize higher layer network protocol delivery performance.

BRIEF SUMMARY

The technique herein optimizes delivery performance from a content delivery network (CDN) edge node by using knowledge of radio link allocation behavior.

According to the technique herein, an IP address of a cellular end user (or equivalent) is recognized by the CDN edge. Then, preferably by tracking idle times both in consecutive downloading bursts in the end user session and in an on/off style radio link allocation pattern, the CDN edge adjusts transport layer network protocol parameters. The approach (which leverages the cross-layer intelligence obtainable from existing CDN infrastructure) thus enables the transport layer protocol implemented at the edge to optimize the delivery performance over the cellular mobile network.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

A live Transmission Control Protocol (TCP) stack measures a round trip time from a sender to a receiver and back to the sender, and it dynamically adjusts a retransmission time out (RTO) value in accordance with the measured round trip time. The RTO is one control knob of the TCP congestion control algorithms. When the TCP stack does not receive any feedback from the receiver for the outstanding packet for the duration of RTO, i.e., if the sender does not receive an acknowledgement from the receiver within the time amount of RTO, the sender assumes that the packet was lost. Retransmissions for the lost packets, i.e., for those the sender did not receive any feedback from the receiver, are the typical remedy to guarantee the data delivery. As such, the value of RTO serves a critical role to assess and respond to the inferred congestion status of the networks. The standard algorithm to dynamically set the RTO value is given as follows:

$$RTO=SRTT+\max(G, K \times RTTVAR),$$

where SRTT is the smoothed round trip time, and it is obtained by a method of exponential moving average. Likewise, RTTVAR is derived by another instance of exponential moving average, and G is a clock of granularity. A typical value of K is 4. The implication of exponential moving average is a rather slow change of the value in consideration. This is one reason that TCP congestion control algorithms are generally viewed as being conservative. Rapid changes of RTO values are mathematically discouraged. Importantly, the above equation does not define anything about the time between two consecutive packets of the TCP session. In other words, this equation does not recognize inactivity periods that can occur in a live TCP connection.

Figure 1:
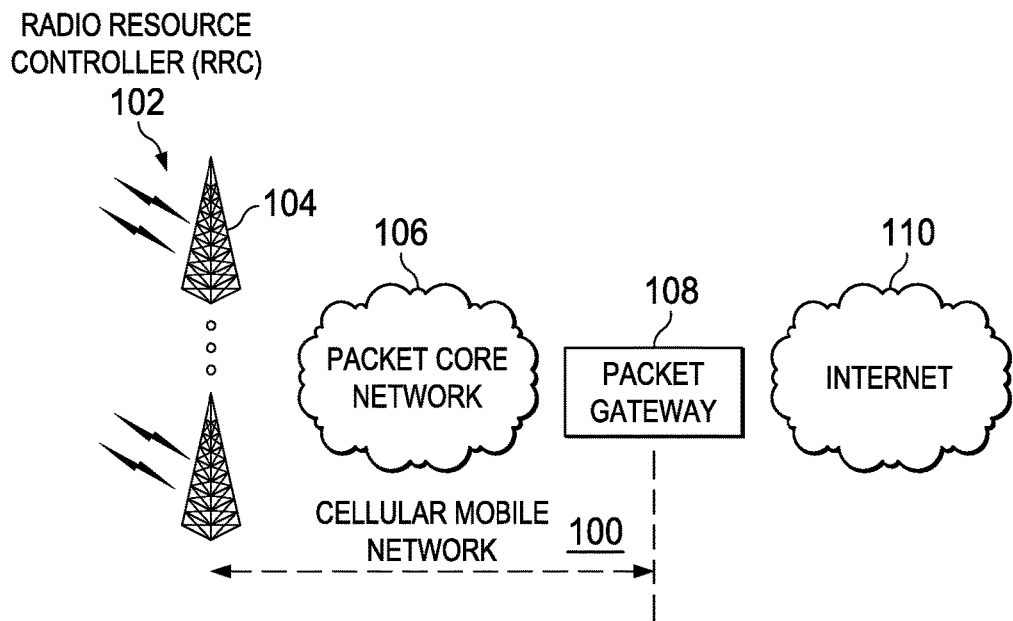
FIG. 1 depicts a cellular mobile network model.
Figure 2:
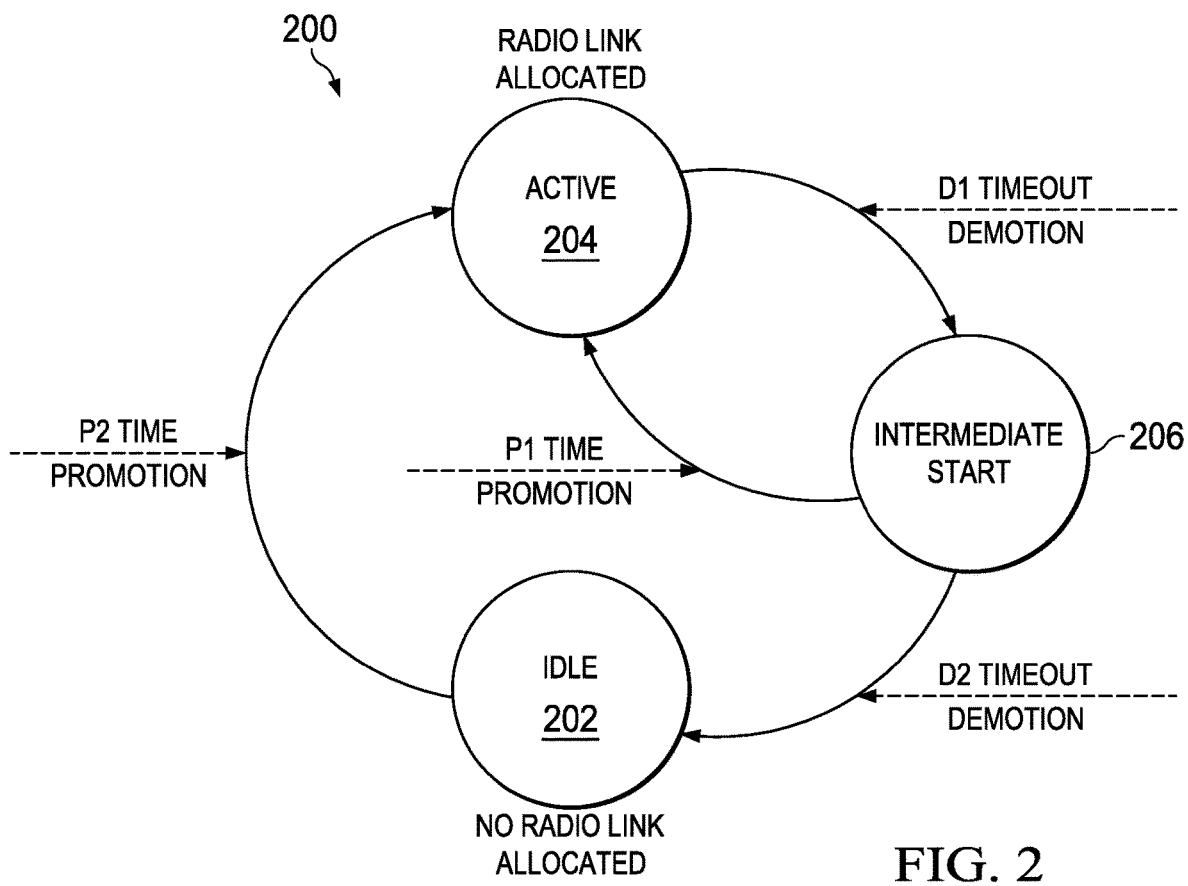
FIG. 2 is a simplified model of promotion and demotion in a radio resource controller (RRC)
Figure 3:
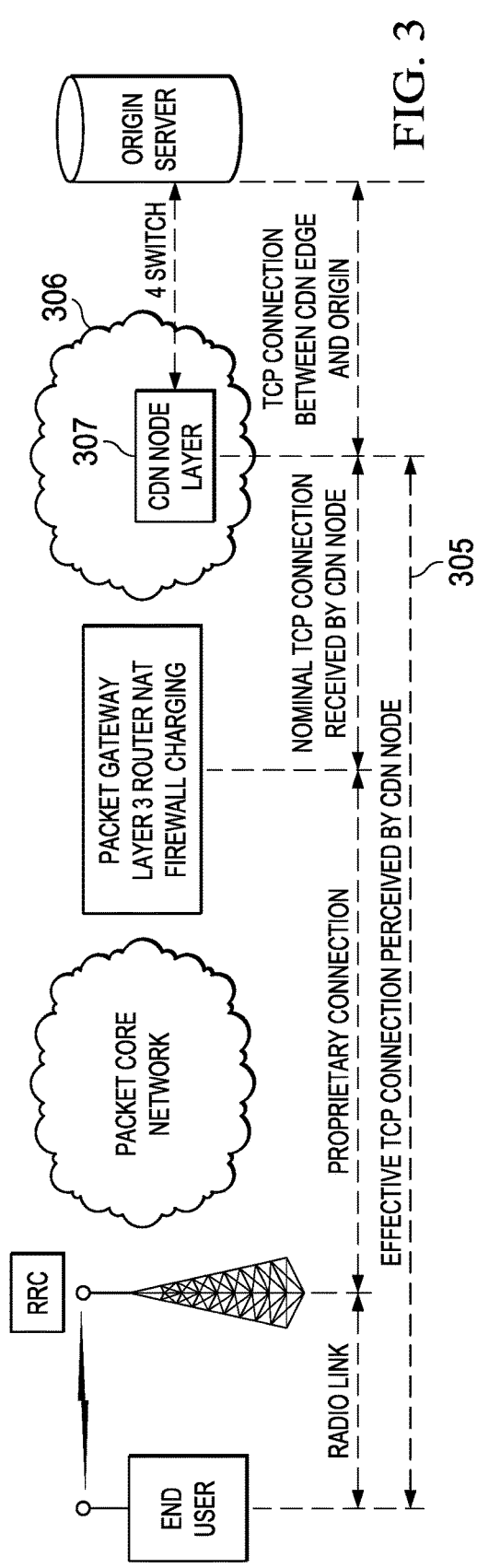
FIG. 3 depicts a content delivery network (CDN) edge node serving clients through a cellular mobile network.

FIG. 3 depicts a situation where content from an origin server 300 is delivered to a mobile client 302 through a content delivery network (CDN) 304 over a cellular mobile network. This drawing is simplified to emphasize that the client-perceived TCP connection 305 in fact is between the client 302 and CDN edge server 307. The CDN 304 can have a more complicated delivery network structure of course. The point is that the CDN edge server 307 is usually located network-geographically close to the packet gateway 306 of the cellular mobile network. This is to minimize the delivery time from the CDN edge 307 to the gateway 306. The drawing also depicts the RRC 308, whose state transitions can have direct impact to the client machine (smart phones, tablets, etc.) and the CDN edge.

Figure 4:
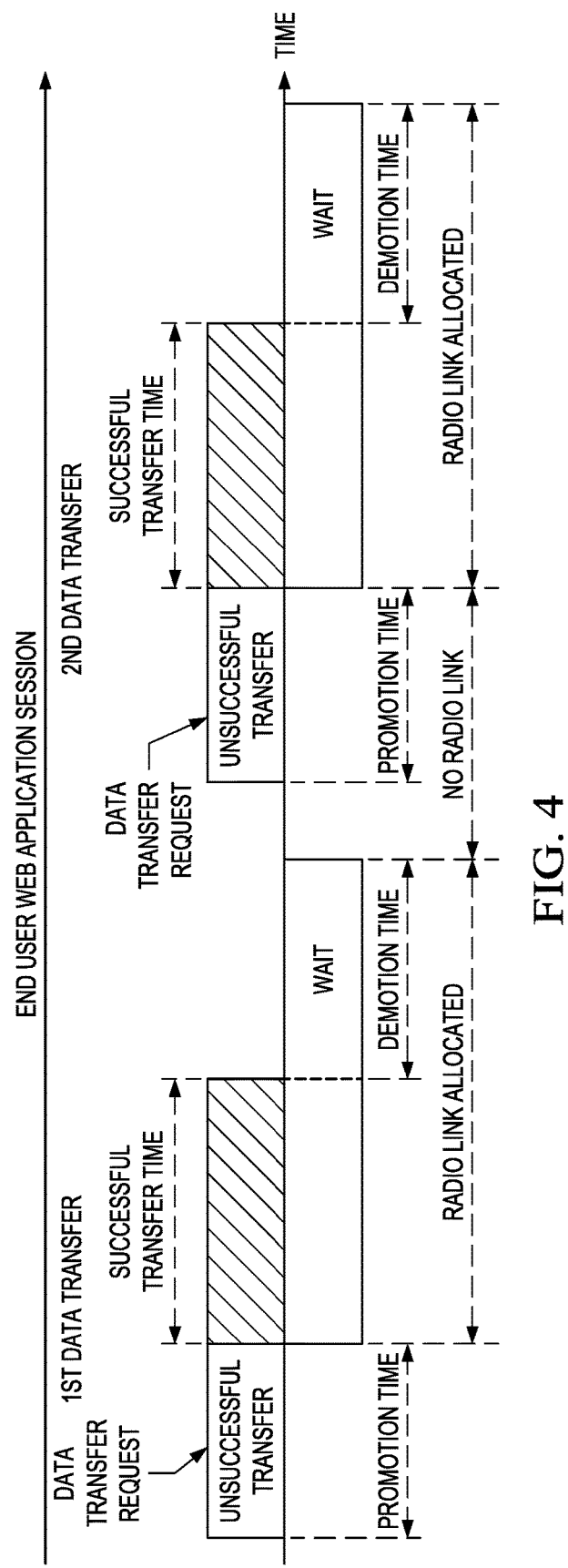
FIG. 4 depicts a snapshot of a timeline showing a TCP connection over a radio resource controller.

In particular, FIG. 4 shows a simple snapshot of a TCP connection over RRC on a timeline. The drawing depicts only an end user session accessing a web site being delivered over the CDN. In this snapshot only two data transfer bursts (or periods) from the server to end user appear. More bursts would show a similar pattern. This drawing models the general case where the data transfer request event is generated regardless of the radio link availability. As can be seen, each transfer period has two sub-periods, unsuccessful and successful transfer times. The unsuccessful sub-period means the transfer attempts, which result in buffering at the radio tower (base station), waiting for radio link allocation. Because the inherited RTO (retransmission timeout) from the immediately preceding data transfer period is likely shorter than the waiting time in the buffer, the unsuccessful transfer faces spurious retransmissions. Meanwhile, the successful transfer means the transfer attempts, which are subject to general congestion control of TCP on the link without incurring a long waiting time in the buffer. The two data transfers exhibit the same pattern. When the transfer request comes, the RRC takes time for promotion, namely, the time required for radio link allocation between the client and base station. The successful data transfer begins only after the completion of promotion. When the transfer is complete, the RRC takes another time period, which is required for demotion. Upon the completion of demotion, no radio link is available between the client and base station. If the time interval between the two consecutive data transfers is shorter than the demotion time, the promotion time for the second transfer would not have been required or would have been shorter. This interval, however, is dependent on a set of parameters, including structure of the content at the origin server, caching structure at CDN nodes, congestion on the Internet, and others. While this pattern is a natural consequence of interactions between TCP and RRC, the interaction necessarily creates some inefficiency in overall network resource utilization.

In particular, the problem is that, after some interval of inactive period (no data transfer), and except the value of retransmit timeout (RTO), TCP resets the parameters to the initial status (cold start). The RTO value at the beginning of the second transfer is normally still the same as the one at the end of the last transfer period. Because the RTO value from the last successful transfer period is likely to be smaller than the promotion time, it is highly likely that the transfer attempt at the beginning of the subsequent transfer period will suffer from the expiration of an RTO that is too small. This in turn triggers immediate retransmissions, which repeatedly time out again until either the RTO value grows large enough or the radio link is eventually allocated after the promotion time.

This cellular network problem, namely, spurious retransmissions due to the expiration of inherited small RTO from an immediately preceding period, is well-recognized by the research community although it is mostly from the end user's perspective.

Improving TCP Over Cellular Mobile at the CDN Edge

According to this disclosure, a technique to improve TCP over cellular mobile networks uses a model in which a TCP stack (at a CDN edge node) is made aware of RRC demotion and promotion times. The approach is sometimes referred to herein a RRC-aware RTO. With knowledge (awareness) of these two time amounts, the TCP stack at the CDN edge is able to adapt to the dynamic availability of the radio link for more efficient delivery guarantee.

Figure 5:
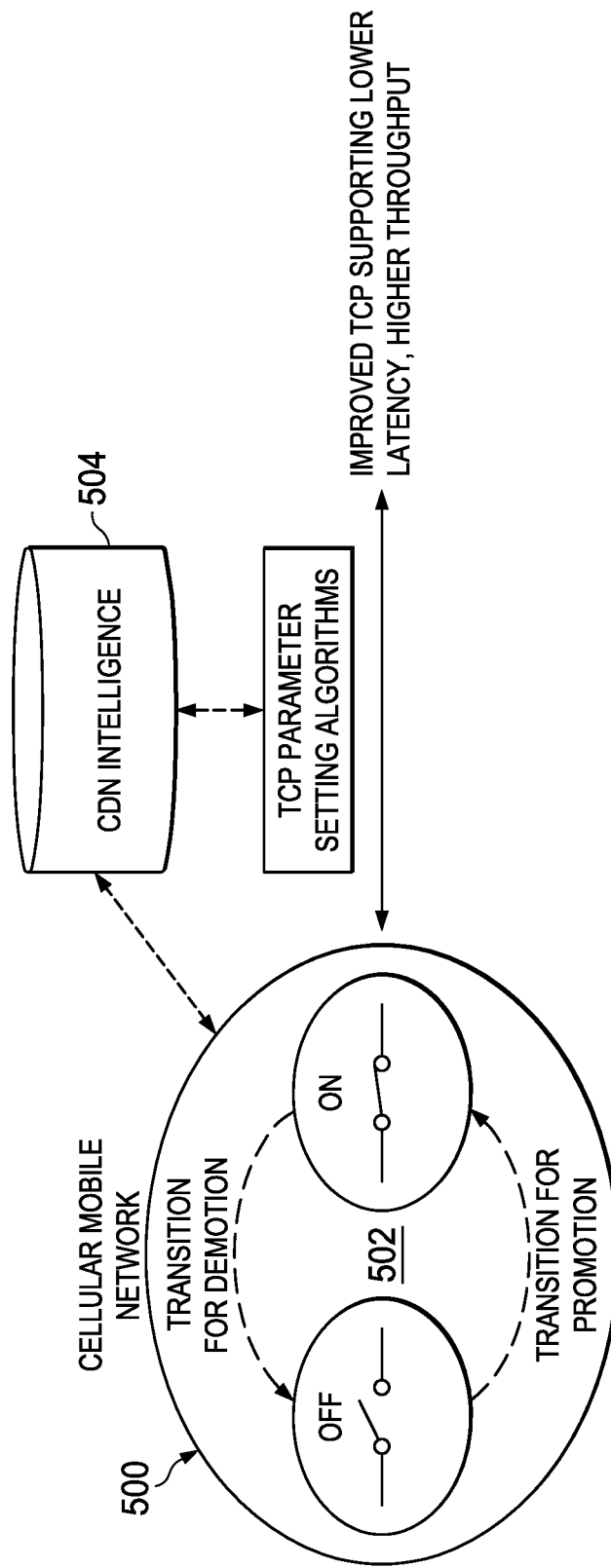
FIG. 5 illustrates a cellular mobile network modeled as an on/off switch of a radio link according to this disclosure.
Figure 6:
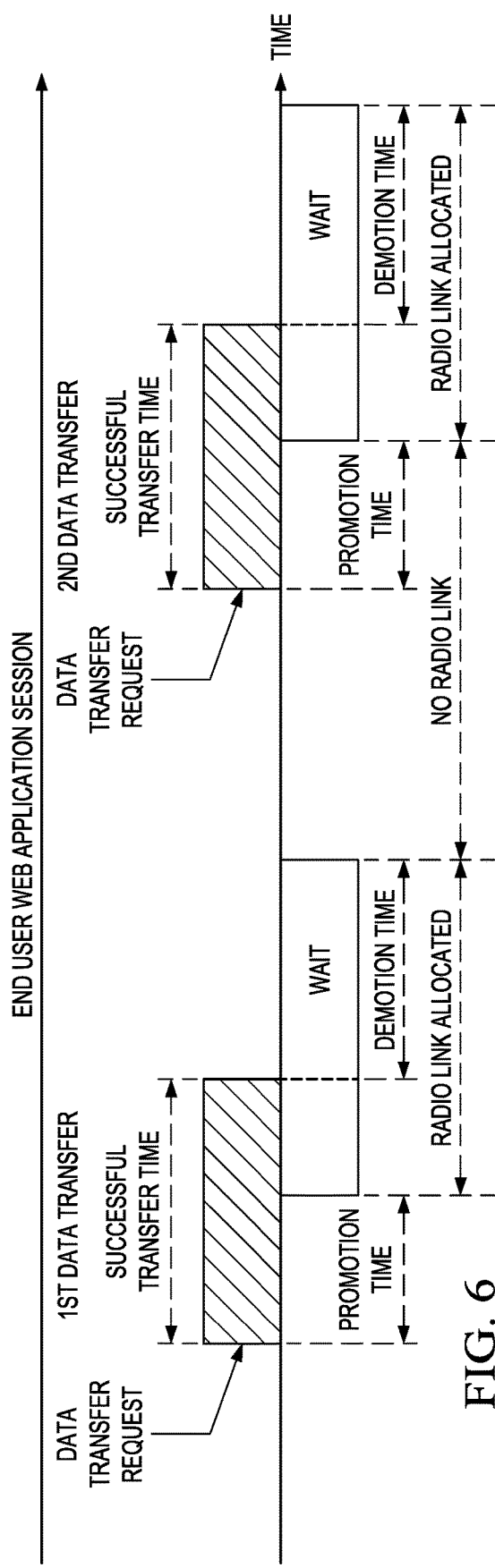
FIG. 6 depicts a snapshot of a timeline showing how the traffic scenario in FIG. 4 is treated according to the technique herein.

FIG. 5 shows the cellular mobile network 500 modeled on/off switch 502 of a radio link. The state transition (from one to another, on to off, or vice versa) is recognized as either promotion or demotion. The CDN 504 edge preferably keeps track of these state transitions. Subsequently, the TCP algorithms therein use the tracking information for higher quality of data delivery. FIG. 6 depicts a snapshot of this model in place, using the traffic scenario in FIG. 4. As can be seen in comparing the two (FIG. 4 versus FIG. 6), the traffic is now treated more efficiently. First, the unsuccessful time periods of the 1st and 2nd data transfers in FIG. 4 are gone in FIG. 6. This is possible because the TCP stack in FIG. 6 knows the demotion time, and it associates the RTO value with the demotion and promotion times. The result is that the spurious retransmissions in FIG. 4 are eliminated in FIG. 6. Second, the 1st and 2nd transfer time periods in FIG. 4 are shorter in FIG. 6 because the unnecessary retransmissions are eliminated.

The CDN node in some sense is perfectly positioned between the end user and origin web server. The web page request and response messages all pass through the CDN node. So, the CDN node has the opportunity to inspect the end user IP address in its natural service logic for HTTP messages. In addition, the IP address blocks allocated to the cellular mobile networks can be publicly obtained by the domain name registrar. By running some load balancing functions, the CDN also has some critical intelligence regarding which end user IP address blocks can be directed (mapped) to which CDN nodes by the DNS resolution. Combining the public domain name registrar information and the naturally produced CDN intelligence, the CDN node is able to tell the type of access network, i.e., cellular mobile or wired.

Figure 7:
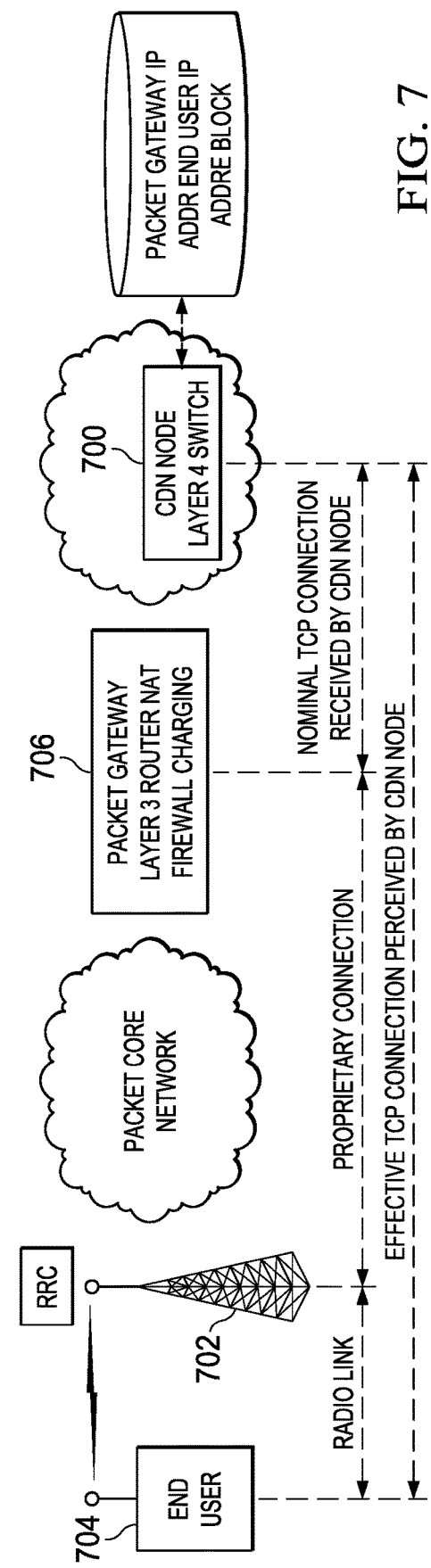
FIG. 7 depicts a TCP connection originating from a cellular mobile network as perceived by a CDN edge node.

FIG. 7 shows a TCP connection originated from a cellular mobile network 702 as perceived by the CDN node. In this drawing, and as usual in HTTP-based communication, the effective data flow and transport level connection are initiated by the end user-704. Managing all the IP traffic, the packet gateway 706 runs the network address translation (NAT) function as part of its duties. The packet gateway 706 allocates an IP address and port number to each newly-initiated transport level connection, and it pretends to be the end user towards the rest of Internet. Therefore, the CDN node 700, while receiving the traffic from the end user, perceives that the packet gateway is the end user. Importantly, the allocated IP address is from an IP address block that a registrar has assigned to this cellular mobile carrier. Thus, by looking up into a CDN database (e.g., containing IP addresses), the CDN node 700 knows if the source IP address is from the cellular mobile IP address block. Once the CDN node identifies the type of access network, it runs its TCP stack with a modified policy. In particular, the CDN node 700 preferably leverages the RRC dynamics for promotion and demotion.

First, in the beginning, the CDN node preferably exercises readily-available intelligence that the RTO value is set a little larger than an upper bound of the promotion time. This substantially reduces the spurious retransmissions due to the unnecessarily early expiration of the inherited small RTO (as described above).

Thus, for example:
1) at the beginning of a new session (cold start):
   a) RTO→$T_{p2}+\alpha$
2) at the end of each transfer burst in the same session:
   a) run a timer, measuring the time lapse $T_{lapse}$ until a next transfer
3) at the beginning of each data transfer other than the very first one in the same session:
   a) if these two conditions are true
      i) $T_{lapse} > T_{d1}$.
      ii) $T_{lapse} < (T_{d1}+T_{d2})$
   b) then RTO→$T_{p1}+\alpha$
   c) else if this condition is true:
      i) $T_{lapse} < (T_{d1}+T_{d2})$
   d) then RTO→$T_{p2}+\alpha$ Preferably, a small value is chosen for α such that the new RTO is a little larger than the promotion time. The above is for the case where the RRC has only one intermediate state. The algorithm set forth above may then be linearly expanded for multiple intermediate states.

While promotion and demotion times are well-documented in RRC technical specifications, the actual timer values for the two events are configurable by the cellular mobile carriers. Carriers, therefore, try to optimize their mobile traffic performance by adjusting the timer values to their unique networking situation. While some carriers voluntarily release to the public the exact timer values, it is still the carrier's discretion to make the information open. Most carriers, however, keep the information confidential. As a surrogate, promotion and demotion can still be obtained from public information, measurement at the client mobile device, or measurement at the CDN edge node. Carriers may have some motivation to publish the timer values in an effort to help the UE industry optimize the network performance through cellular mobile networks. When the carrier publishes the promotion and demotion times, these values of course can be used by the CDN nodes directly. Another avenue is to use an RRC transition measurement tool on the mobile client equipment, and then to report (collect) that information when the end user client interacts with a CDN edge node.

The CDN edge node may also implement an RRC transition measurement, which may work by utilizing round trip times. In a typical measurement scenario, and by artificially increasing inter-packet times, a point will be reached where the interval gets larger than the demotion time. Then, the round trip time will be higher by some measurable constant. Here, the packet interval should be interpreted as the time for demotion, and, the constant value as the promotion time. By repeating the scenario with carefully chosen intervals, demotion and promotion times are detected.

Because a CDN node delivers large volumes of traffic to the end user, it can naturally collect a long history of round trip times from the CDN node to the mobile client, e.g., by utilizing the TCP acknowledgements. Moreover, the CDN node does not always have to monitor the round trip time. Because the event of RRC timer value reconfiguration is not frequent, and because it is not likely to change dramatically, the CDN node can run the analysis task perhaps once a day (or over some other configurable time period) when the traffic is usually low. The round trip time is measured on the "TCP connection perceived by CDN node" in FIG. 7.

As a variant embodiment, the transfer periods after the very first one in the session may be further improved by utilizing both the RRC state transition times and the RTO value setting algorithms. This embodiment takes advantage of the fact that, upon each sampling of RTT (round trip time), TCP changes the RTO value in a smooth manner (through a series of equations). The smoothness is mathematically characterized by an exponential moving average. By having some constant value in the averaging process, the RTO value becomes rather conservative, i.e., the smoothing process prevents the RTO value from fluctuating rapidly. As such, once the RTO value is set to $T_{p2}$ or $T_{p1}$, the algorithms may take some time to decrease (update) the RTO close to the small value from the immediately preceding transfer period, based only on the subsequent successful RTT samples. Thus, upon the first successful sampling of RTT measurement, which signals that the radio link has now been allocated, the RTO value may be promoted to $T_{inherited}$ if one of the following condition holds true for the respective status:

$$T_{p1} > T_{inherited}$$

$$T_{p2} > T_{inherited}$$

This guarantees a faster recovery of RTO values as soon as the radio link is allocated. The value $T_{inherited}$ is the small RTO value inherited from the immediately preceding transfer period.

The TCP timer measures the time lapse, $T_{lapse}$ between two consecutive data transfer in the same session. Preferably, each TCP connection with a mobile end user needs one such timer. This timer can use the same timer for the task of RTT measurement with a little different ending treatment. In particular, at the end of each on period (data transfer), the timer is invoked. At the beginning of successive data transfer (at the end of off period), the simple RTO setting policy above is applied.

By leveraging the knowledge about the radio link status, the approach herein allows TCP to substantially eliminate spurious retransmissions at the CDN edge, which in turn results in lower latency and higher throughput. This in turn provides for higher utilization of the radio link, as the total time in which the radio link is allocated for the same amount of data transfer will be shorter due to the elimination of unnecessary retransmissions. The approach is readily implemented using existing CDN knowledge of access networks and the end user IP address space.

A CDN edge node typically is a machine having one or more hardware processors, memory and disk, an operating system (such as Linux running a TCP stack), and CDN-specific applications (e.g., a cache). The edge node stores customer configuration files for managing customer-specific edge delivery, e.g., as per U.S. Pat. No. 8,447,837, the disclosure of which is incorporated by reference. The '837 patent describes a technique for setting TCP connection parameters that are configurable on the edge node. The CDN edge node has access to data collected by the CDN mapping infrastructure; thus, knowledge of end user access networks and the allocated IP address spaces are known or ascertainable by the CDN.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics.

The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of edge server itself, namely, by extending its conventional functionality as has been described.

Having described our invention, what is claimed is set forth as follows.

The invention claimed is:

1. A method of delivery, comprising:
at an edge node of a content delivery network, the content delivery network being distinct from a mobile network:
receiving radio link state transition information generated in the mobile network;
associating the radio link state transition information received from the mobile network as one of: promotion and demotion associated with a radio resource controller (RRC) operating in the mobile network; and
responsive to a determination by the edge node that a request is associated with an end user on the mobile network, the request having been forwarded from the mobile network to the content delivery network, using the received radio link state transition information to adjust a transport layer protocol parameter of the edge node based on the promotion or demotion times.

2. The method as described in claim 1 wherein the transport layer protocol parameter is retransmission time out (RTO).

3. The method as described in claim 2 wherein an initial RTO value is adjusted to be slightly larger than an upper bound of the promotion time.

4. The method as described in claim 3 wherein the RTO thereafter is adjusted in proportion to the promotion time based on a measurement of idle time from a last packet sending time of a previous sending burst to a beginning of a new sending burst.

5. The method as described in claim 1 further including using round trip time measurements to estimate promotion and demotion times associated with the RRC in the mobile network.

6. The method as described in claim 1 wherein the radio link transition information includes the promotion and demotion times.

7. The method as described in claim 1 wherein the transport layer protocol parameter is set in accordance with availability of the radio link as defined in the radio link state transition information.

8. The method as described in claim 7 wherein the transport layer protocol parameter is retransmission time out (RTO) whose value is set at a beginning of a download data transfer burst.

9. An apparatus operating as an edge node of a content delivery network, comprising:
a processor;

memory holding computer program instructions executed by the processor, the computer program instructions configured at the edge node and operative there to:

receive radio link state transition information generated in at least one mobile network, the mobile network being distinct from the content delivery network;

associate the radio link state transition information received from the mobile network as one of: promotion and demotion associated with a radio resource controller (RRC) operating in the mobile network; and responsive to a determination that a request is associated with an end user on the mobile network, the request having been forwarded from the mobile network to the content delivery network, use the received radio link state transition information to adjust a transport layer protocol parameter of the edge node based on the promotion or demotion times.

10. The apparatus as described in claim 9 wherein the transport layer protocol parameter is retransmission time out (RTO).

11. The apparatus as described in claim 10 wherein an initial RTO value is adjusted to be slightly larger than an upper bound of the promotion time.

12. The apparatus as described in claim 11 wherein the RTO thereafter is adjusted in proportion to the promotion time based on a measurement of idle time from a last packet sending time of a previous sending burst to a beginning of a new sending burst.

13. The apparatus as described in claim 9 further including using round trip time measurements to estimate promotion and demotion times associated with the RRC in the mobile network.

14. The apparatus as described in claim 9 wherein the radio link transition information includes the promotion and demotion times.

15. The apparatus as described in claim 9 wherein the transport layer protocol parameter is set in accordance with availability of the radio link as defined in the radio link state transition information.

16. The apparatus as described in claim 15 wherein the transport layer protocol parameter is retransmission time out (RTO) whose value is set at a beginning of a download data transfer burst.

* * * * *